US012237609B2

(12) United States Patent
Shell

(10) Patent No.: US 12,237,609 B2
(45) Date of Patent: Feb. 25, 2025

(54) TAMPER-RESISTANT ELECTRICAL OUTLET COVERS

(71) Applicant: Geddy's Mom LP, Warren, NJ (US)

(72) Inventor: Sarah Shell, Watchung, NJ (US)

(73) Assignee: Geddy's Mom LP, Warren, NJ (US)

( * ) Notice: Subject to any disclaimer, the term of this patent is extended or adjusted under 35 U.S.C. 154(b) by 389 days.

(21) Appl. No.: 17/855,193

(22) Filed: Jun. 30, 2022

(65) Prior Publication Data

US 2024/0006798 A1 Jan. 4, 2024

(51) Int. Cl.
*H01R 13/453* (2006.01)

(52) U.S. Cl.
CPC ................................ *H01R 13/4532* (2013.01)

(58) Field of Classification Search
CPC ............................ H01R 13/44; H01R 439/136
See application file for complete search history.

(56) References Cited

U.S. PATENT DOCUMENTS 2,559,151 A * 7/1951 Getzoff ................ H01R 13/447 174/67
3,956,573 A * 5/1976 Myers .................... H02G 3/185 174/67
4,293,733 A 10/1981 Royer
4,302,624 A * 11/1981 Newman .............. H01R 13/447 174/67
4,760,215 A * 7/1988 Cook ....................... H02G 3/14 174/67
5,009,610 A * 4/1991 Woskow .............. H01R 13/443 174/67
6,780,031 B1 8/2004 Valls
7,541,541 B1 6/2009 Baldwin et al.
7,683,257 B1 3/2010 Shotey et al.
8,410,363 B1 * 4/2013 Baldwin .................. H02G 3/14 174/67
10,014,616 B2 * 7/2018 Schutte ................ H01R 13/447
11,088,516 B1 * 8/2021 Baldwin .............. H01R 13/453
11,588,310 B1 * 2/2023 Baldwin ................ H02G 3/185
2012/0034795 A1 * 2/2012 Nitobe ................... H01R 13/64 439/142
2014/0162480 A1 6/2014 Schutte et al.

FOREIGN PATENT DOCUMENTS

KR 102261883 B1 * 6/2021 ............. H01R 13/44

* cited by examiner

*Primary Examiner* — Hae Moon Hyeon
(74) *Attorney, Agent, or Firm* — Pierson Ferdinand LLP; Rachel H. Huffstetler

(57) ABSTRACT

Tamper-resistant electrical outlet covers include a wall plate, at least one cover arm rotatably coupled to the wall plate, and a locking mechanism configured to maintain the cover arm in a closed position covering an electrical outlet when the locking mechanism is locked. The locking mechanism is unlocked to allow the cover arm to rotate to an open position exposing the electrical outlet.

22 Claims, 11 Drawing Sheets

TAMPER-RESISTANT ELECTRICAL OUTLET COVERS

BRIEF DESCRIPTION OF THE DRAWINGS

The accompanying drawings illustrate a number of example embodiments and are a part of the specification. Together with the following description, these drawings demonstrate and explain various principles of the present disclosure.

FIG. 4A is an exploded view of the locking mechanism, FIG. 4B is a partially transparent view of the locking mechanism in an unlocked position, and FIG. 4C is a partially transparent view of the locking mechanism in a locked position.

FIG. 5A is a cross-sectional view of the locking mechanism in a locked position, FIG. 5B is a cross-sectional view of the locking mechanism in an unlocked position, and FIG. 5C is a bottom exploded view of the locking mechanism.

Figure 1C:
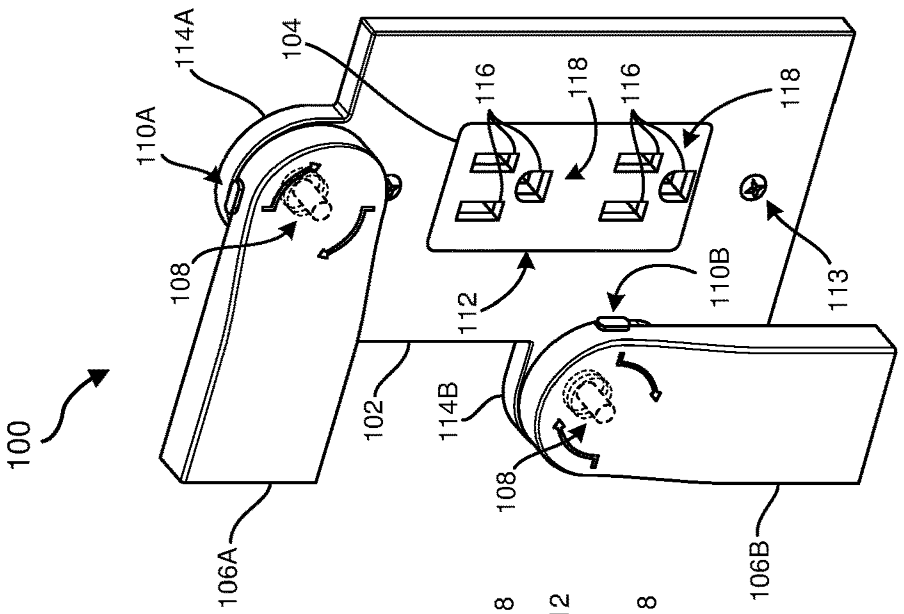
FIGS. 1A-1C illustrate perspective views of a tamper-resistant electrical outlet cover in three respective states, according to at least one embodiment of the present disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

BACKGROUND OF THE INVENTION

Electrical outlets are a common and necessary feature of homes and buildings to provide power to various electrical devices. However, these outlets provide a safety hazard, particularly for young children (e.g., babies, toddlers, etc.) who do not have the knowledge or mental judgment to avoid the dangers of inserting a finger or electrically conductive object into outlet receptacles. A significant number of young children suffer injuries every year from such activities.

Some outlet covers exist that include a polymer base and prongs for insertion into outlet receptacles. In tight outlet receptacles, this type of outlet cover can be difficult to insert and/or remove, even for responsible adults. In addition, these outlet covers can easily be misplaced once removed. In outlet receptacles that have loosened over time, the outlet covers may be too easy to remove for young children, making them ineffective at preventing injury.

Another type of outlet cover includes a cover plate that has holes corresponding to outlet receptacles. These holes may initially be misaligned with the outlet receptacles, requiring partial insertion of a plug and then rotation to align the holes with the outlet receptacles. Use of these outlet covers can be cumbersome, and they can still be easy for a young child to rotate with a finger or object.

BRIEF SUMMARY OF THE INVENTION

The present disclosure is generally directed to improved tamper-resistant electrical outlet covers. As will be explained in greater detail below, embodiments of the present disclosure may include such outlet covers that include a wall plate shaped and sized for laterally surrounding an electrical outlet, at least one cover arm rotatably coupled to the wall plate via at least one pivot point, and a locking mechanism. The locking mechanism may be configured to maintain the cover arm in a closed position blocking the electrical outlet when the locking mechanism is locked. The locking mechanism may be unlocked, such as by depression of one or more buttons, sliding a slider, etc., to enable the cover arm to rotate about the pivot point into an open position that exposes the electrical outlet. The action of unlocking and rotating the cover arms may be intuitive and easy for an adult, but difficult or impossible for a young child. Additionally or alternatively, the minimum force required to move the cover arm into a position that exposes the electrical outlet may be enough that a young child would find it difficult or impossible to move the cover arm. For example, the cover arm may be configured to rotate only after a minimum force of 5 lbf, 10 lbf, or 15 lbf is applied.

DETAILED DESCRIPTION OF THE INVENTION

Features from any of the embodiments described herein may be used in combination with one another in accordance with the general principles described herein. These and other embodiments, features, and advantages will be more fully understood upon reading the following detailed description in conjunction with the accompanying drawings and claims.

The following will provide, with reference to FIGS. 1A-10, detailed descriptions of various embodiments and examples of tamper-resistant electrical outlet covers and components thereof. With reference to FIG. 11, the following will provide detailed descriptions of example methods of fabricating tamper-resistant electrical outlet covers.

Figure 1B:
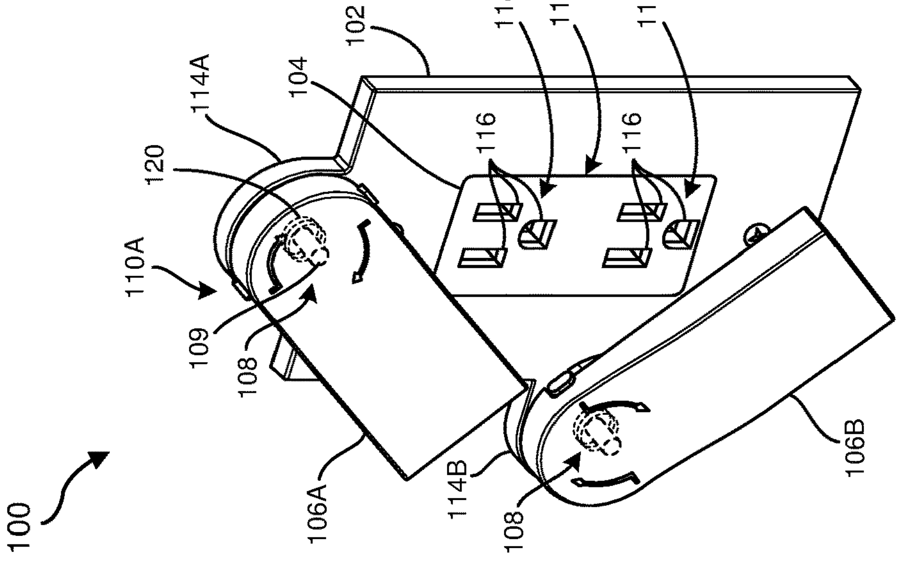
Figure 1A:
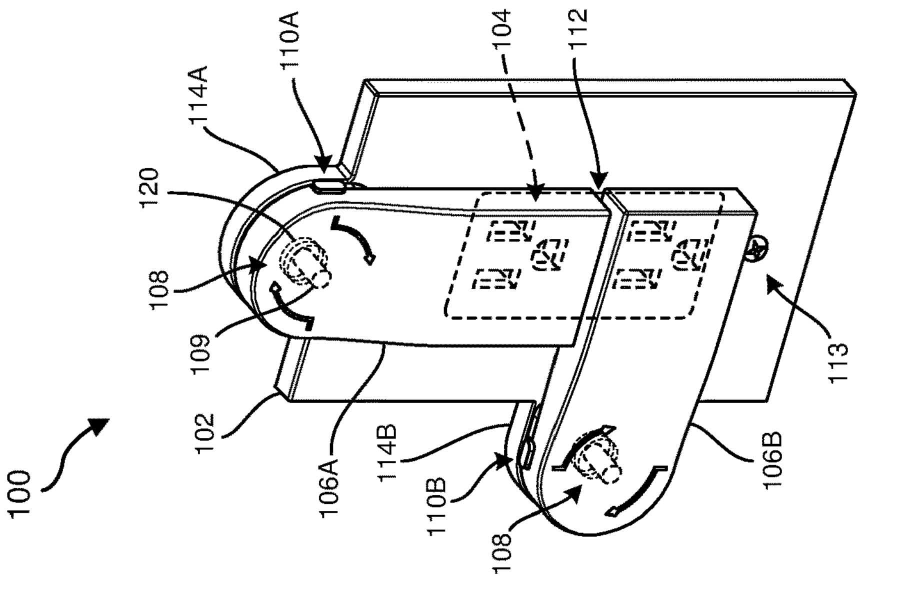
Figure 2:
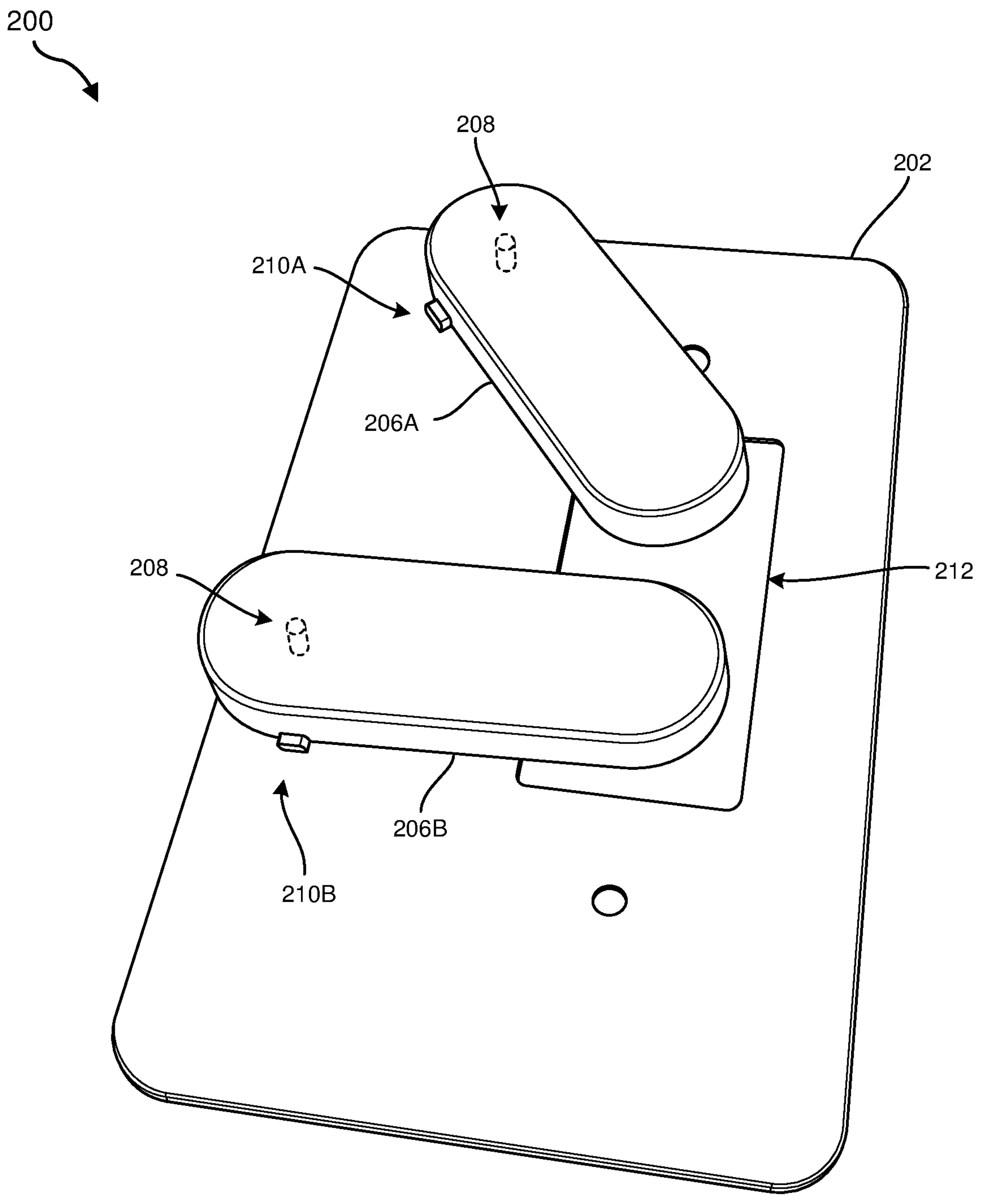
FIG. 2 is a perspective view of an outlet cover, according to at least one additional embodiment of the present disclosure.

FIGS. 1A-1C illustrate perspective views of a tamper-resistant electrical outlet cover 100 (also referred to as an "outlet cover 100" for simplicity) in three respective states, according to at least one embodiment of the present disclosure. The outlet cover 100 may include a wall plate 102 shaped and sized for laterally surrounding an electrical outlet 104. A first cover arm 106A and a second cover arm 106E3 (collectively referred to as "cover arms 106") may be rotatably coupled to the wall plate 102 via respective pivot points 108. A first locking mechanism 110A and a second locking mechanism 110E3 (collectively referred to as "locking mechanisms 110") may also be included to lock and unlock the respective first and second cover arms 106A, 106B. The cover arms 106 include a pivot end portion on one end of the cover arms 106 which includes the pivot point 108 and a receptacle covering end portion on the opposite end of the cover arms 106. With reference to FIG. 2, the pivot end portions of the cover arms 106 are the left-most ends (including the pivot point 108) and the receptacle covering end portion are the right-most ends (covering the receptacles 116) shown in the orientation of FIG. 2.

The wall plate 102 may include a central aperture 112 shaped and sized for surrounding the electrical outlet 104. As illustrated in FIGS. 1B and 1C, the shape of the central aperture 112 may be generally rectangular to accommodate a rectangular electrical outlet 104. In additional embodiments, the central aperture 112 may have a different shape, such as circular, oblong, etc., such as for accommodating different styles and shapes of electrical outlets 104. The wall plate 102 may also include screw apertures 113 for securing the wall plate 102 in place on a wall adjacent to the electrical outlet 104.

The wall plate 102 may also include features for coupling the cover arms 106 to the wall plate 102. For example, the wall plate 102 may include a first extension 114A for providing a base for the first cover arm 106A and for a corresponding pivot point 108. A second extension 114B may provide a base for the second cover arm 106B and for its corresponding pivot point 108. The first and second extensions 114A, 114B are also collectively referred to "extensions 114" for simplicity. The extensions 114 may extend laterally (e.g., along a wall when installed) away from the electrical outlet 104 to provide sufficient space for the length of the cover arms 106. The pivot points 108 may include shafts 109 (FIG. 1A) extending away from the extension 114 (e.g., away from a wall when installed) of the wall plate 102 and into complementary receptacles of the cover arms 106. In additional embodiments, the pivot points 108 may include shafts 109 that extend from the cover arms 106 and into complementary receptacles in the wall plate 102. In yet another example, a separate shaft 109 may extend into complementary receptacles in both the wall plate 102 and the cover arm 106.

The wall plate 102 may be formed of a material that can withstand expected use. For example, a material of the wall plate 102 may include a polymer material and/or a metal material. The material of the wall plate 102 may be resistant to breaking or bending in cases of misuse, as well, such as if the cover arms 106 are pulled in a direction away from the wall.

The electrical outlet 104 may include at least one receptacle 116 for receiving and providing electrical power to a lead of an electrical plug. The electrical outlet 104 may be any standard or non-standard electrical outlet 104 and need not have the configuration shown in FIGS. 1A-1C. By way of example and for purposes of illustration, the electrical outlet 104 may include one or more sets 118 of receptacles 116. Each set 118 may include a positive receptacle, a negative receptacle, and a ground receptacle.

Each of the cover arms 106 may be configured to, in a closed position, cover at least one receptacle 116 or set 118 of receptacles 116. FIG. 1A illustrates the cover arms 106 in a closed position. The cover arms 106 may be rotatable out of the closed position and into an open position. An intermediate position between the closed position and the open position is illustrated in FIG. 1B. The open position is illustrated in FIG. 1C. The cover arms 106 may have a sufficient length to cover the receptacles 116 and to rotate away from the receptacles 116 to allow an electrical plug to be inserted into the receptacles 116. When rotated into the open position, the cover arms 106 may be sized and positioned to clear the receptacles 116 with a wide enough margin to make room for a number of different electrical plug types and sizes, such as a standard two-prong, three-prong, or four-prong plug, a wall charger, an adapter plug (e.g., an AC adapter plug), a high-voltage plug, a flat plug (e.g., having a cord that extends from the plug in a direction along the wall), etc.

The pivot points 108 may define axes about which the cover arms 106 rotate between the closed position and the open position. The rotational axes may extend away from (e.g., perpendicular to) a face of the wall plate 102. Thus, the cover arms 106 may travel substantially parallel to the face of the wall plate 102 during rotation between the closed position and the open position.

In some examples, the term "substantially" in reference to a given parameter, property, or condition, may refer to a degree that one skilled in the art would understand that the given parameter, property, or condition is met with a small degree of variance, such as within acceptable manufacturing tolerances. For example, a parameter that is substantially met may be at least about 90% met, at least about 95% met, at least about 99% met, or fully met.

As illustrated in FIGS. 1A-1C, the first cover arm 106A may be an upper cover arm 106A configured to cover an upper set 118 of receptacles 116, and the second cover arm 106B may be a side cover arm 106B configured and positioned to cover a lower set 118 of receptacles 116. Other positions and configurations of the cover arms 106 are also possible. For example, the first cover arm 106A may be coupled to the wall plate 102 in one of: an upper region of the wall plate 102, a laterally side region of the wall plate 102, a corner region of the wall plate 102, or a lower region of the wall plate 102. Likewise, the second cover arm 106B may be coupled to the wall plate 102 in one of: the upper region of the wall plate 102, the laterally side region of the wall plate 102, the corner region of the wall plate 102, or the lower region of the wall plate 102.

The cover arms 106 may be formed of a polymer material and/or a metal material. The material of the cover arms 106 may be resistant to breaking or bending upon expected use or misuse. Additionally, the material of the cover arms 106 may be heat- and flame-resistant, such as in the case of an electrical hot spot or fire.

The locking mechanisms 110 may be configured to maintain the respective cover arms 106 in the closed position. Without intervention of a user, and when no electrical plug is installed in the receptacles 116, the cover arms 106 may be locked in the closed position by the locking mechanisms 110. In some examples, a biasing element 120 (e.g., a torsional spring, a leaf spring, etc.) (FIG. 1A) may be configured to bias each cover arm 106 to the closed position. Thus, when the cover arm 106 is released by a user or when an electrical plug is removed from the electrical outlet 104, the cover arm 106 may tend to rotate toward the closed position. If there is no electrical plug or other obstruction, the cover arm 106 may rotate to and automatically lock in the closed position covering the receptacles 116. To unlock the locking mechanisms 110, a user may perform an unlocking action, such as pressing a button or lever, squeezing two buttons (as illustrated in FIGS. 1A-1C) or levers, sliding a slider, rotating a knob, etc.

Some examples of locking mechanisms 110 that may be used in the outlet cover 100 are described in detail below with reference to FIGS. 4A-5C.

In some embodiments of the present disclosure, two different types of action may be required to unlock the locking mechanisms 110 and to rotate the cover arms 106 out of the closed position and into the open position. For example, one action may include pressing a button (or sliding a slider, or rotating a knob, etc.) to unlock the cover arm 106 and another action may include rotating the cover arm 106 from the closed position to the open position. The two different types of action may require a level of dexterity that may be difficult for babies and toddlers to achieve. In addition, the biasing element 120 may be configured to have a spring force that requires a certain level of strength to rotate, adding further difficulty for babies and toddlers to operate the outlet cover 100.

Although the term "wall" is used herein for purposes of illustration, the present disclosure is not limited to use in conjunction with a wall. For example, embodiments of the present disclosure may be used in conjunction with an electrical outlet 104 positioned in a wall, a ceiling, a floor, a table, a vehicle, a generator, a power strip, a battery backup, etc.

FIG. 2 is a perspective view of a tamper-resistant electrical outlet cover 200 (also referred to as an "outlet cover 200" for simplicity), according to at least one additional embodiment of the present disclosure. In some respects, the outlet cover 200 of FIG. 2 may be similar to the outlet cover 100 of FIG. 1. For example, the outlet cover 200 may include a wall plate 202 shaped and sized for laterally surrounding an electrical outlet. A first cover arm 206A and a second cover arm 206B (collectively referred to as "cover arms 206") may be rotatably coupled to the wall plate 202 via pivot points 208. A first locking mechanism 210A and a second locking mechanism 210B (collectively referred to as "locking mechanisms 210") may also be included to lock and unlock the respective first and second cover arms 206A, 206B. The wall plate 202 may include one or more central apertures 212 shaped and sized for insertion of one or more receptacles of an electrical outlet.

As illustrated in FIG. 2, the wall plate 202 may have a generally rectangular shape without distinct extensions (as in FIGS. 1A-1C). For example, the wall plate 202 may have a sufficient overall lateral length and width to position the pivot points 208 for connection of the cover arms 206 at a sufficient distance from the electrical outlet for appropriate operation.

In addition, FIG. 2 illustrates that the pivot points 208 need not be directly above or directly to the side of the electrical outlet as in FIG. 1. For example, the pivot point 208 coupling the first cover arm 206A to the wall plate 202 may be positioned diagonally relative to the electrical outlet (e.g., up and to the side of the electrical outlet). In other examples, both of the pivot points 208 may be located on a same lateral side of the electrical outlet, on opposite lateral sides of the electrical outlet, directly above and directly beneath of the electrical outlet, or in any other suitable position to improve manufacturing, aesthetics, ergonomic use, etc.

FIG. 1 shows the cover arms 106 as having an elongated shape with a proximal end (e.g., the end near the pivot point 108) being rounded and a distal end (e.g., the end covering the electrical outlet when in the closed position) being square. However, the distal ends may have any shape that can effectively cover and block the electrical outlet. As shown in FIG. 2, the cover arms 206 may have an elongated shape with both proximal and distal ends rounded.

Figure 3:
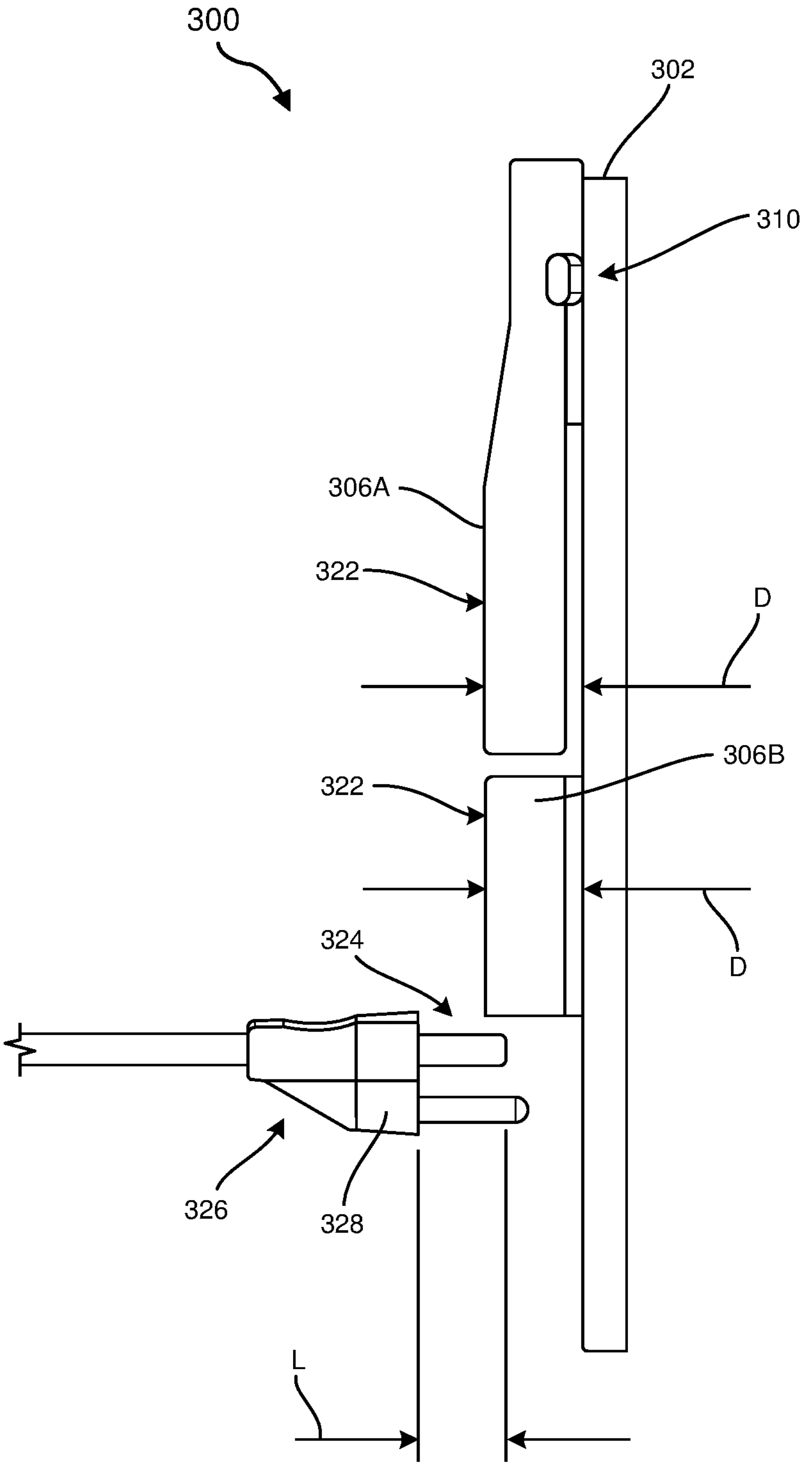
FIG. 3 is a side view of an outlet cover, according to at least one embodiment of the present disclosure.

FIG. 3 is a side view of a tamper-resistant electrical outlet cover 300 (also referred to as an "outlet cover 300" for simplicity), according to at least one embodiment of the present disclosure. In some respects, the outlet cover 300 of FIG. 3 may be similar to the outlet covers 100, 200 of FIGS. 1 and 2 and described above. For example, the outlet cover 300 may include a wall plate 302 shaped and sized for laterally surrounding an electrical outlet. A first cover arm 306A and a second cover arm 306B (collectively referred to as "cover arms 306") may be rotatably coupled to the wall plate 302. Locking mechanisms 310 may be configured to lock and unlock the respective first and second cover arms 306A, 306B.

As shown in FIG. 3, each of the cover arms 306 may have an outer surface 322 at a distal end thereof, which may be a furthest surface from the wall plate 302. The outer surface 322 may be positioned a distance D from the electrical outlet that is covered by the respective cover arms 306. The distance D may be selected to inhibit a pin 324 of an electrical plug 326 from reaching a conductive contact of the electrical outlet. The pin 324 or pins 324 that are configured to carry an electrical charge (e.g., so-called "neutral" and "hot" pins 324) may have a length L. If the cover arms 306 are in a rotational position to only partially cover, or to uncover, the receptacles of the electrical outlet, a base 328 of the electrical plug 326 may abut against the outer surface 322 at the distance D. This abutment may prevent the pins 324 of the electrical plug 326 from reaching the conductive contacts of the electrical outlet. This may improve a safety of the outlet cover 300 by inhibiting partial insertion of the electrical plug 326 and exposure of electrified pins 324. Thus, the electrical plug 326 may be capable of full insertion only when the cover arms 306 are fully clear of the electrical outlet receptacles with a sufficient margin to avoid the base 328 of the electrical plug 326 abutting against the outer surface 322 of the cover arms 306.

The distance D at which the outer surfaces 322 of the cover arms 306 are positioned away from the electrical outlet may depend on the type of electrical plug 326 that is to be used with the outlet cover 300. For example, a Type B three-pronged electrical plug 326 used in the United States of America, Canada, and elsewhere may include active (e.g., non-ground) pins 324 that have a length L of between about 15.9 mm and about 18.3 mm. Since the conductive contacts of an electrical outlet are recessed from a face of the electrical outlet, a distance D shorter than the length L may still be sufficient to block the pins 324 from reaching the conductive contacts. Thus, for a Type B electrical plug 326, the distance D may be at least about 12 mm (e.g., between 12 mm and 20 mm).

Other types of electrical plugs 326 (e.g., higher voltage plugs, plugs used in certain other countries, etc.) may have pins 324 with different lengths L. If the outlet cover 300 is intended for use with such other types of electrical plugs 326, the distance D may be adjusted accordingly to accomplish the same blocking effect with those electrical plugs 326.

Figure 4C:
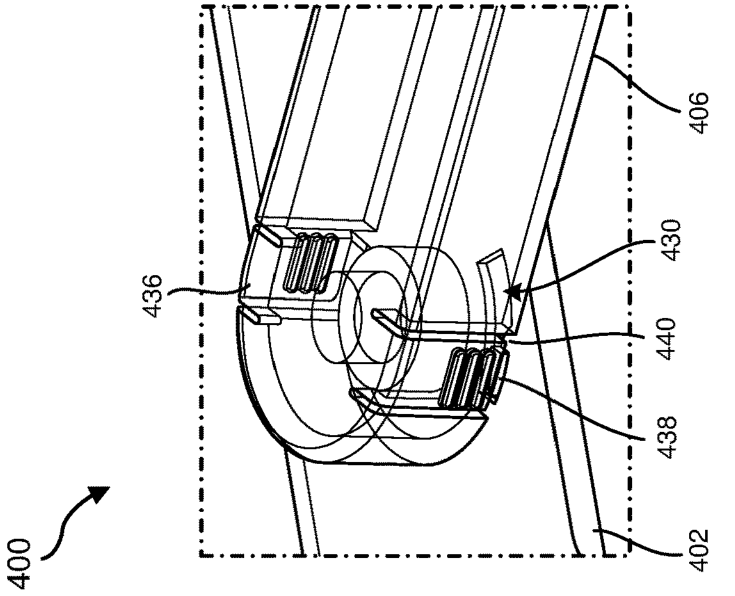
FIGS. 4A-4C are perspective views of a locking mechanism of an outlet cover, according to at least one embodiment of the present disclosure.
Figure 4B:
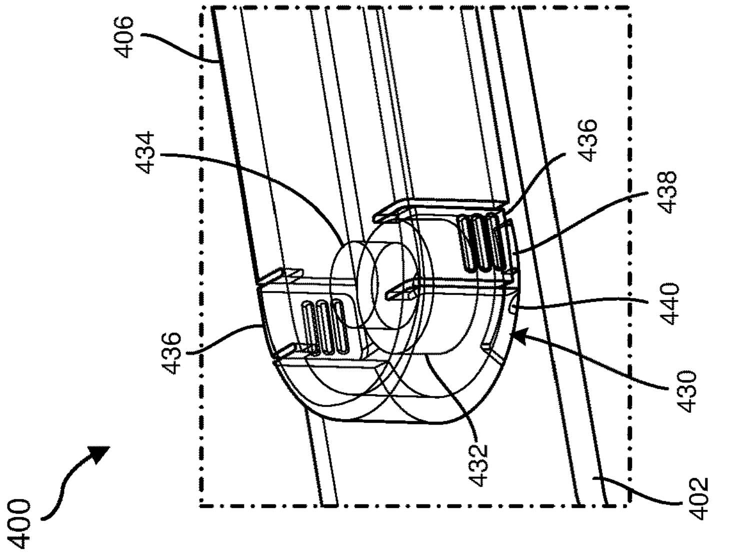
Figure 4A:
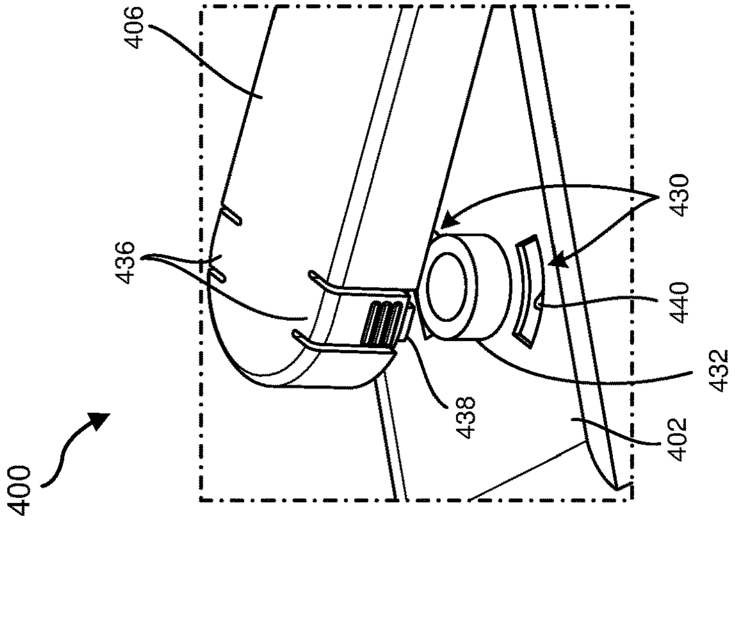

FIGS. 4A-4C are perspective views of a locking mechanism 400 of an outlet cover, according to at least one embodiment of the present disclosure. FIG. 4A is an exploded view of the locking mechanism 400, FIG. 4B is a partially transparent view of the locking mechanism 400 in an unlocked position, and FIG. 4C is a partially transparent view of the locking mechanism 400 in a locked position.

The locking mechanism 400 may include features and components in or on a wall plate 402 and a cover arm 406. For example, the locking mechanism 400 may include two locking recesses 430 in a face of the wall plate 402 that are on opposite sides of a protruding pivot recess 432. A shaft 434 in the cover arm 406 may be shaped and sized to fit within the protruding pivot recess 432 to rotatably coupled the cover arm 406 to the wall plate 402. The cover arm 406 may include levers 436 on opposing sides of shaft 434. Each of the levers 436 may include a locking tab 438 at a lower end thereof that fits within the locking recesses 430. The locking recesses 430 may each include a tooth 440 that protrudes into the locking recess 430. The tooth 440 may have one slanted surface and one stop surface.

As shown in FIG. 4B, when the locking mechanism 400 is in an open position, the locking tab 438 may be on a slanted surface side of the tooth 440. A biasing element (e.g., a spring) may apply a rotational force to the cover arm 406 to urge the cover arm toward the closed position illustrated in FIG. 4C. As the cover arm 406 rotates from the open position toward the closed position, the locking tab 438 may slide up the slanted surface of the tooth 440 as the lever 436 bends inward. In some embodiments, the biasing element may be configured to apply a sufficient force to bend the lever 436 inward enough to fully pass the tooth 440. After the locking tab 438 passes the tooth 440, the lever 436 may bend outward and into a locked position.

When the locking mechanism 400 is in the closed position (FIG. 4C), the locking tab 438 may abut against the stop surface of the tooth 440 if the cover arm 406 is pushed to rotate toward the open position, inhibiting further rotation toward the open position. Thus, the locking tab 438 and the tooth 440 may maintain the cover arm 406 in the closed, locked position.

To unlock the locking mechanism 400 and allow the cover arm 406 to rotate to the open position, a user may squeeze the opposing levers 436 to shift the locking tabs 438 inward of the teeth 440. After the levers 436 are sufficiently pressed inward and while depressing the levers 436, the user may rotate the cover arm 406 with sufficient force to overcome a biasing force (e.g., a spring force) of the biasing element and to move the cover arm 406 into the open position.

As illustrated in FIGS. 4A-4C, the levers 436 may be an integral, unitary part of the cover arm 406 that is configured to bend (e.g., in a cantilever fashion) upon application of a sufficient inward force. The inward force required to shift the locking tabs 438 past the teeth 440 may be tailored to be difficult or impossible for a young child, but possible for a typical adult.

Although levers 436 that are configured to be squeezed are shown in FIGS. 4A-4C, this embodiment is presented by way of illustration and example. Other mechanism types for unlocking the locking mechanism 400 are also included in the present disclosure. For example, the levers 436 may be replaced by spring-biased push buttons. Other example locking mechanism types are described below with reference to FIGS. 5A-10.

Figure 5A:
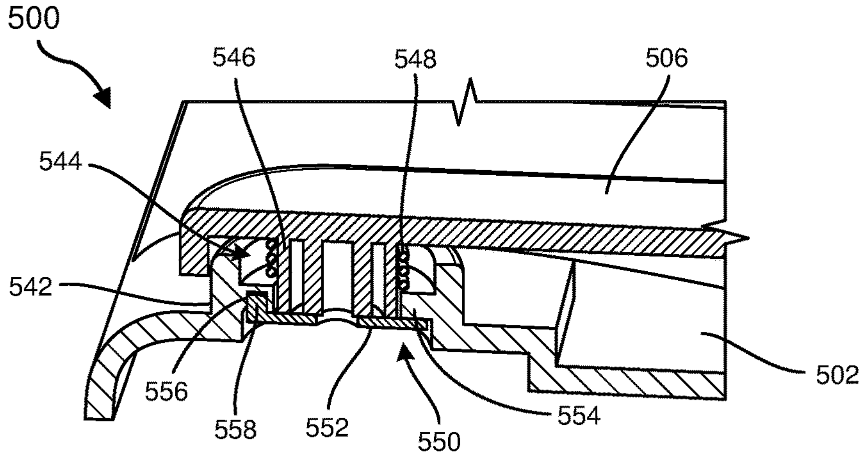
FIGS. 5A-5C are perspective views of a locking mechanism of an outlet cover, according to at least one additional embodiment of the present disclosure.
Figure 5B:
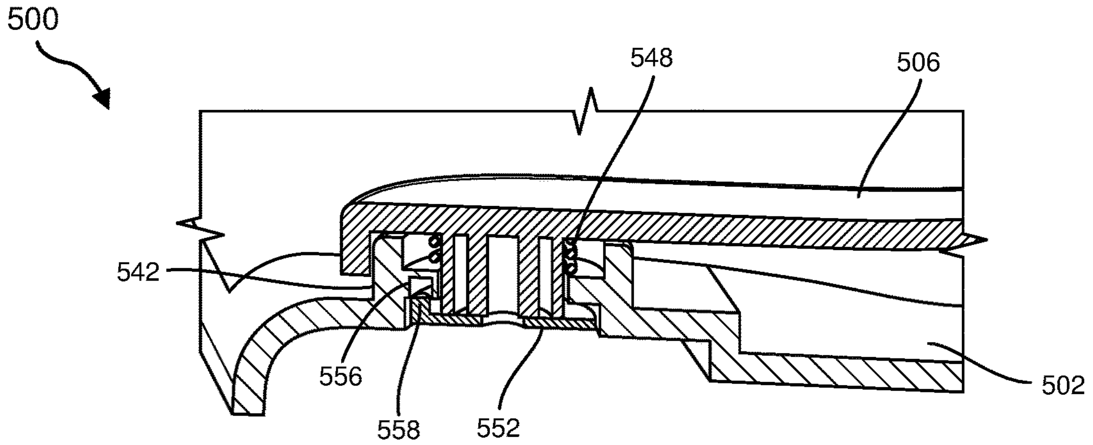
Figure 5C:
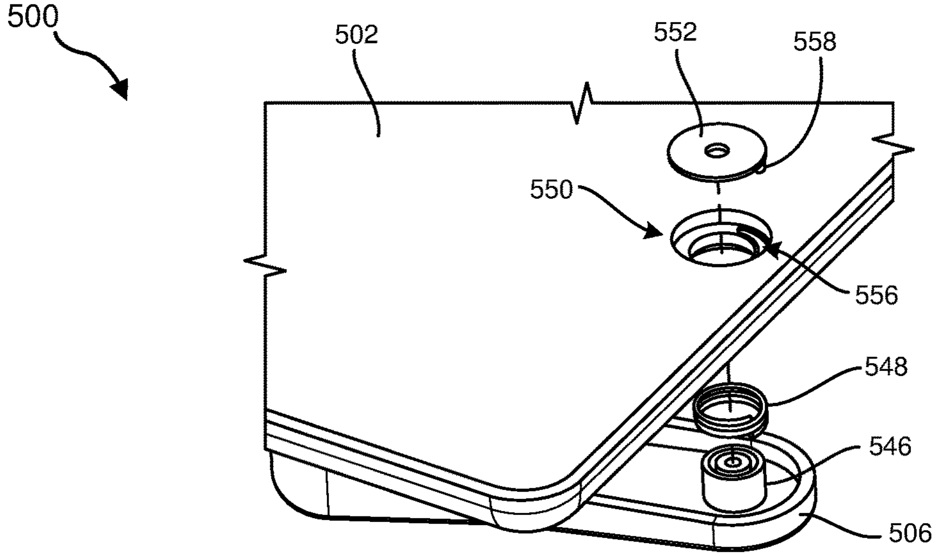

FIGS. 5A-5C are perspective views of a locking mechanism 500 of an outlet cover, according to at least one additional embodiment of the present disclosure. FIG. 5A is a cross-sectional view of the locking mechanism 500 in a locked position, FIG. 5B is a cross-sectional view of the locking mechanism 500 in an unlocked position, and FIG. 5C is a bottom exploded view of the locking mechanism 500.

A wall plate 502 may include a pivot protrusion 542 including a front recess 544 for receiving a shaft 546 of a cover arm 506 and a biasing element 548 (e.g., a spring). The pivot protrusion 542 may also include a back recess 550 for receiving a locking washer 552. An inward flange 554 may separate the front recess 544 from the back recess 550. A lock recess 556 may be present in the inward flange 554 on the side of the back recess 550. The locking washer 552 may include a lock pin 558 that is sized to fit in the lock recess 556 when the locking mechanism 500 is in a locked state.

In some embodiments, the locking washer 552 may be secured to a bottom of the shaft 546, such as via a screw, an adhesive, a pin, etc. In additional embodiments, another biasing element (e.g., a spring) may force the locking washer 552 and lock pin 558 into the locked position with the lock pin 558 positioned at least partially within the lock recess 556. When the lock pin 558 is within the lock recess 556, the cover arm 506 may be inhibited from rotating out of the locked, closed position (as shown in FIG. 5A) due to physical interference between the lock pin 558 and an internal wall of the lock recess 556.

The locking mechanism 500 may be a push-to-unlock locking mechanism 500. For example, to unlock the locking mechanism 500 and allow the cover arm 506 to rotate into an open position, the cover arm 506 may be pressed down in an axial direction (e.g., along an axis of rotation of the cover arm 506, toward the wall plate 502). This action may compress the biasing element 548 and may push the locking washer 552 such that the lock pin 558 becomes clear of the lock recess 556, as illustrated in FIG. 5B. In this state, the cover arm 506 may be able to rotate, such as to the open position in which the cover arm 506 uncovers and exposes an electrical outlet.

FIGS. 6-10 illustrate various additional types and styles of locking mechanisms that may be used to lock and unlock a tamper-resistant electrical outlet cover. These locking mechanisms are presented for illustrative purposes only and may be used in any combination.

Figure 6:
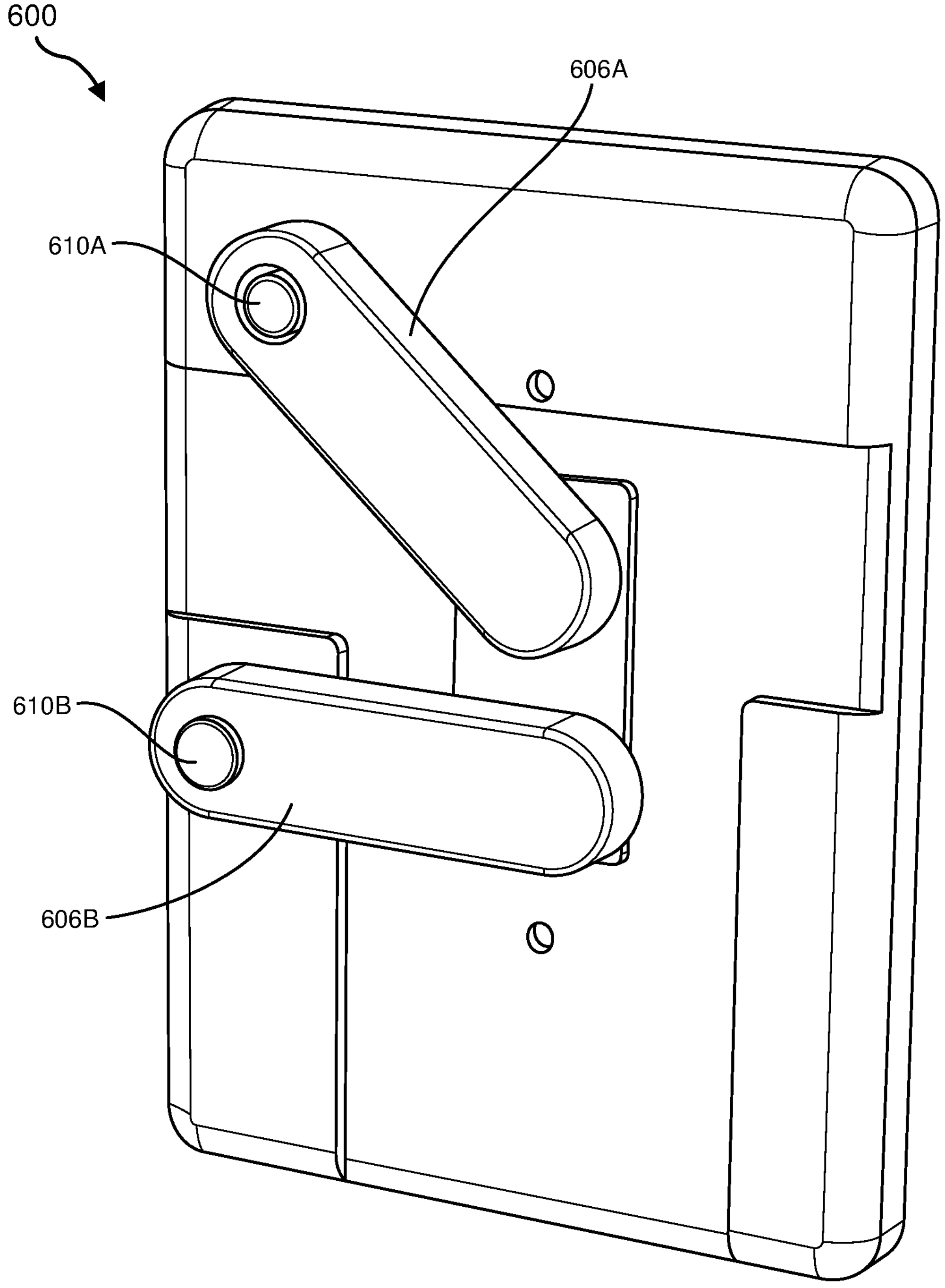
FIG. 6 is a perspective view of an outlet cover, according to at least one more embodiment of the present disclosure.

FIG. 6 is a perspective view of an outlet cover 600, according to at least one more embodiment of the present disclosure. A first locking mechanism 610A may include a push button on a first cover arm 606A that is aligned with a rotational axis of the first cover arm 606A (e.g., positioned over a pivot point of the first cover arm 606A). The first locking mechanism 610A may be unlocked by pushing on the push button, after which the first cover arm 606A may be rotated to an open position uncovering a corresponding electrical outlet.

A second locking mechanism 610B may include a pull button on a second cover arm 606B. The pull button may be aligned with a rotational axis of the second cover arm 606B. The second locking mechanism 610B may be unlocked by pulling on the pull button, after which the second cover arm 606B may be rotated to an open position uncovering a corresponding electrical outlet. In additional examples, a pull button may be positioned on the wall plate.

Figure 7:
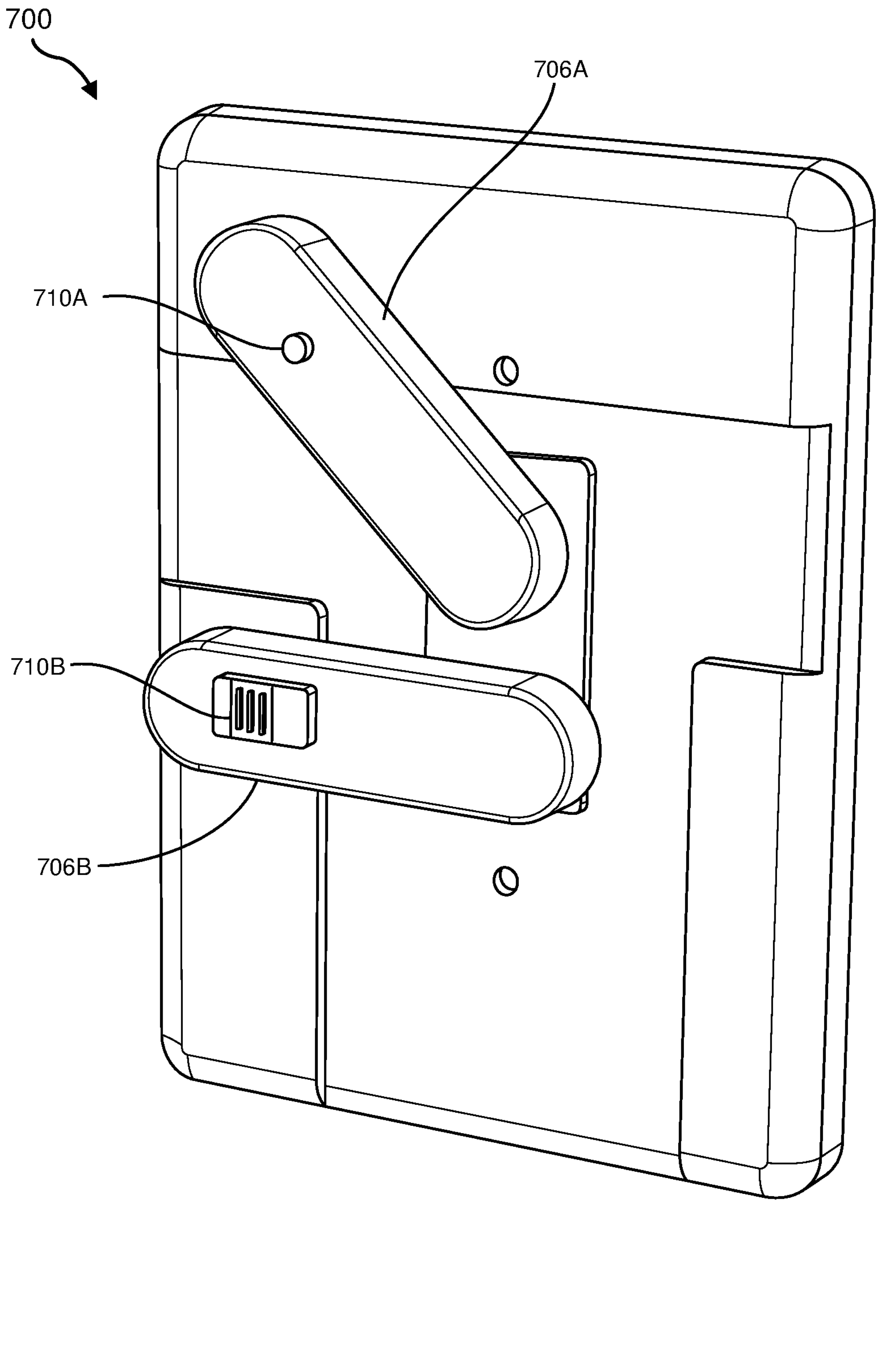
FIG. 7 is a perspective view of an outlet cover, according to at least one further embodiment of the present disclosure.

FIG. 7 is a perspective view of an outlet cover 700, according to at least one further embodiment of the present disclosure. A first locking mechanism 710A may include a push button on an outer surface of a first cover arm 706A. The push button may not be aligned with a rotational axis of the first cover arm 706A. The first locking mechanism 710A may be unlocked by pushing on the push button, after which the first cover arm 706A may be rotated to an open position uncovering a corresponding electrical outlet.

A second locking mechanism 710B may include a slider on a second cover arm 706B. The second locking mechanism 710B may be unlocked by sliding the slider from a locked position to an unlocked position, after which the second cover arm 706B may be rotated to an open position uncovering a corresponding electrical outlet.

Figure 8:
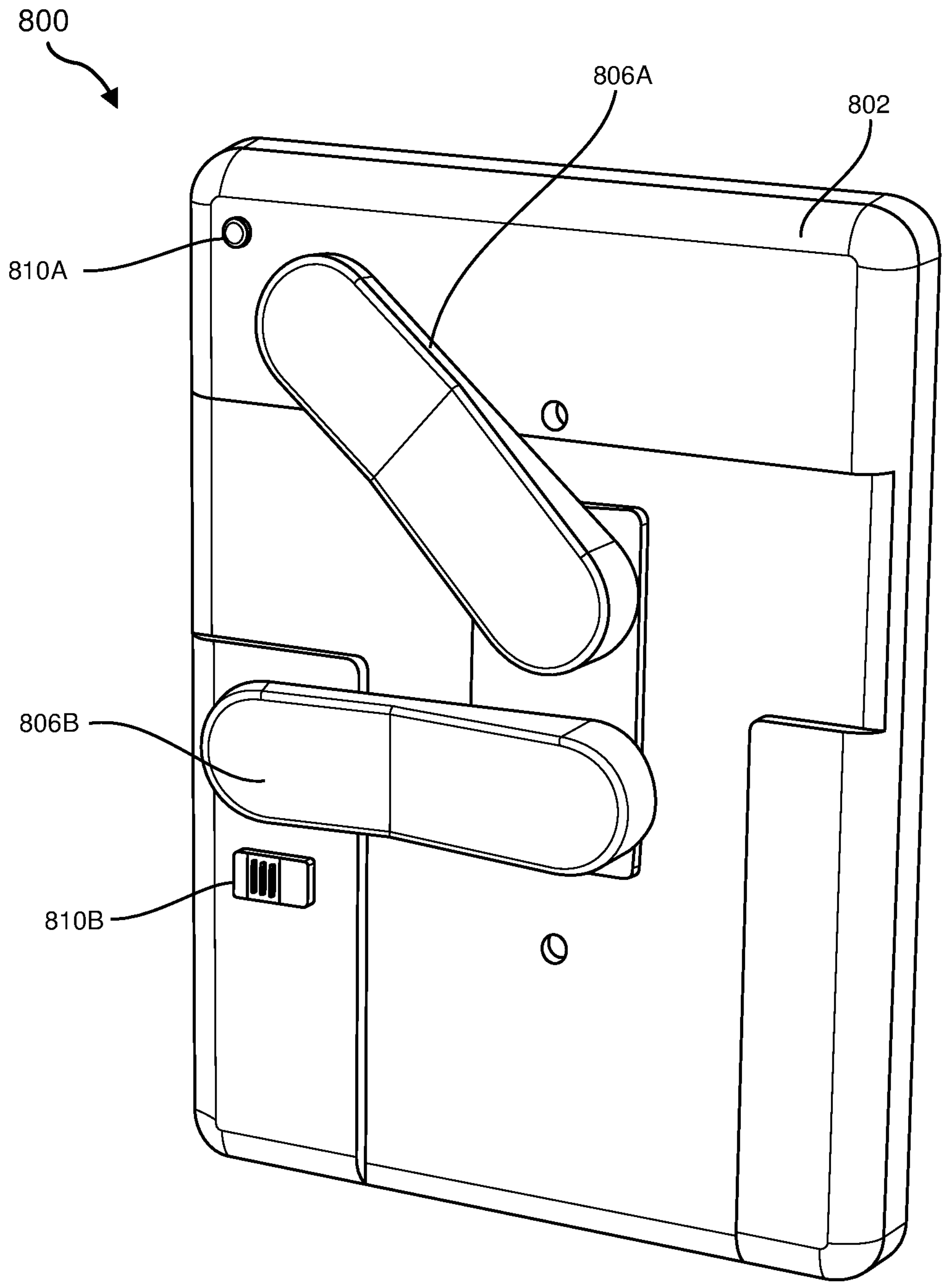
FIG. 8 is a perspective view of an outlet cover, according to at least one other embodiment of the present disclosure.

FIG. 8 is a perspective view of an outlet cover 800, according to at least one other embodiment of the present disclosure. A first locking mechanism 810A may include a push button on a wall plate 802. The push button may be adjacent to, and may be configured to unlock, a first cover arm 806A. The first locking mechanism 810A may be unlocked by pushing on the push button, after which the first cover arm 806A may be rotated to an open position uncovering a corresponding electrical outlet.

A second locking mechanism 810B may include a slider on the wall plate. The slider may be adjacent to, and may be configured to unlock, a second cover arm 806B. The second locking mechanism 810B may be unlocked by sliding the slider from a locked position to an unlocked position, after which the second cover arm 806B may be rotated to an open position uncovering a corresponding electrical outlet.

Figure 9:
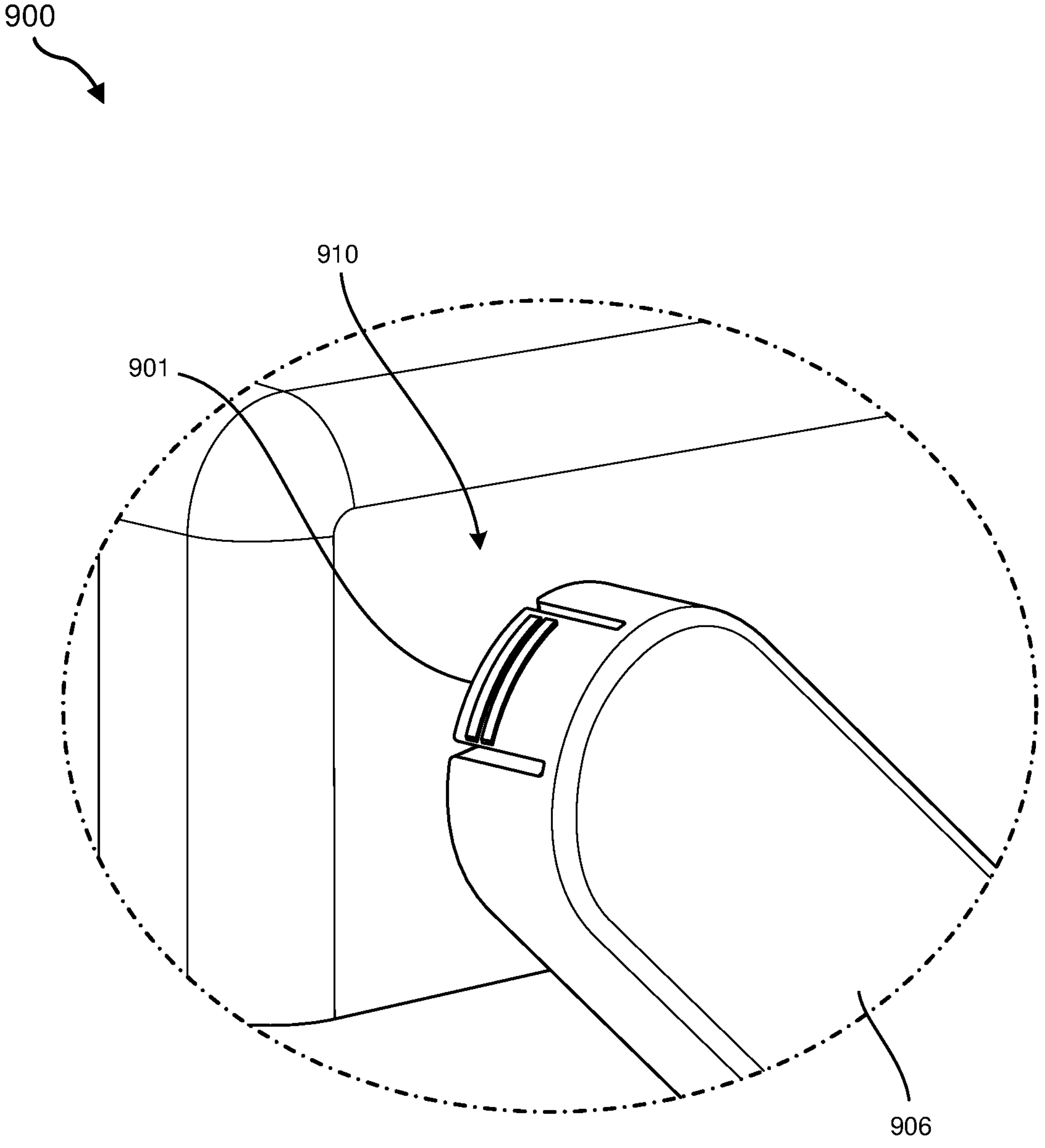
FIG. 9 is a detailed view of a locking mechanism of an outlet cover, according to at least one more embodiment of the present disclosure.

FIG. 9 is a detailed view of a locking mechanism 900 of an outlet cover, according to at least one more embodiment of the present disclosure. The locking mechanism 900 may include a push lever 901 that is aligned with a longitudinal axis (e.g., along a length) of a cover arm 906. The locking mechanism 900 may be unlocked by pushing the push lever 901 toward a rotational axis of the cover arm 906 and along the longitudinal axis of the cover arm 906. Then the cover arm 906 may be rotated into an open position uncovering a corresponding electrical outlet.

Figure 10:
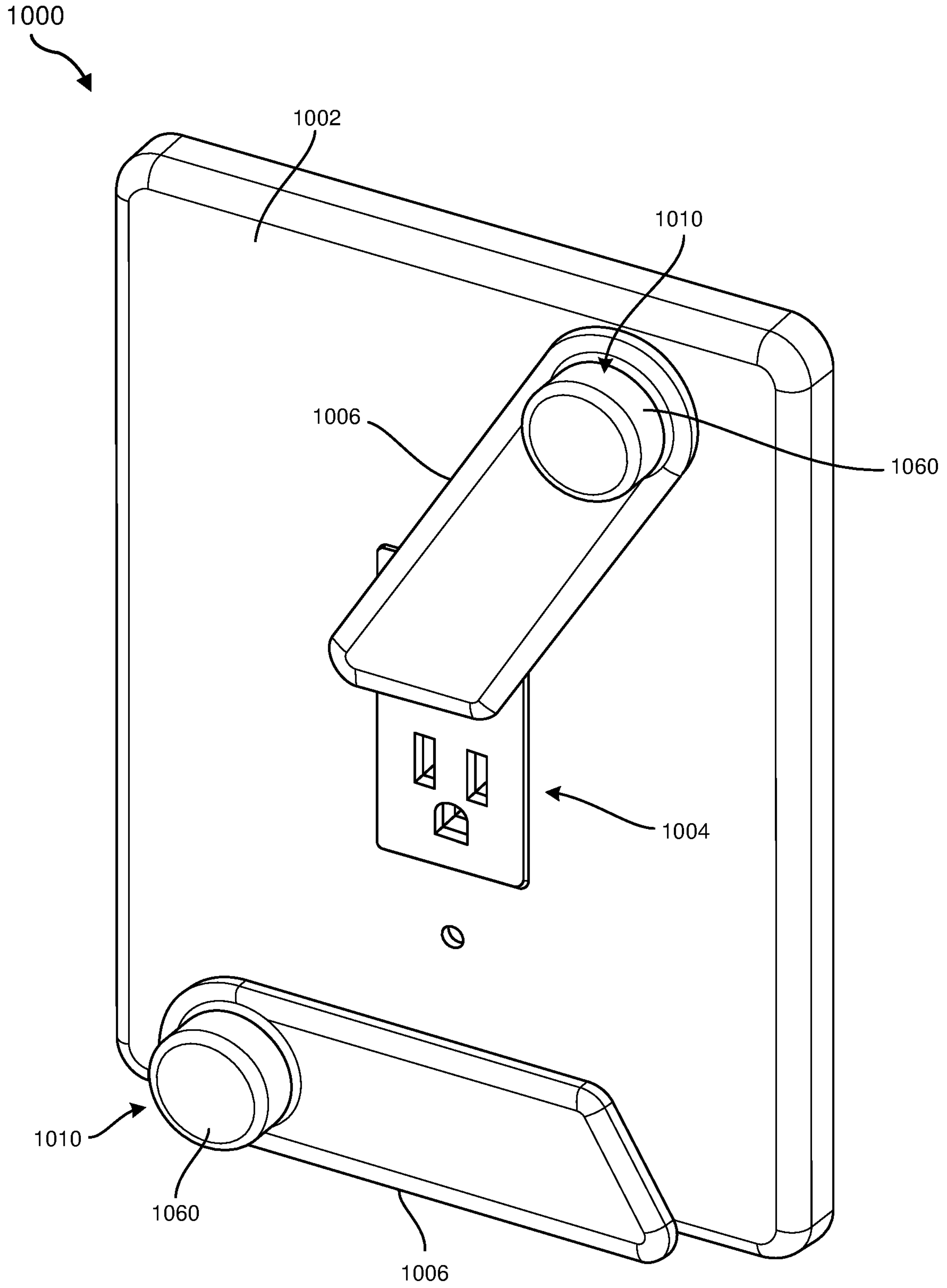
FIG. 10 is a perspective view of an outlet cover, according to at least one additional embodiment of the present disclosure.
Figure 11:
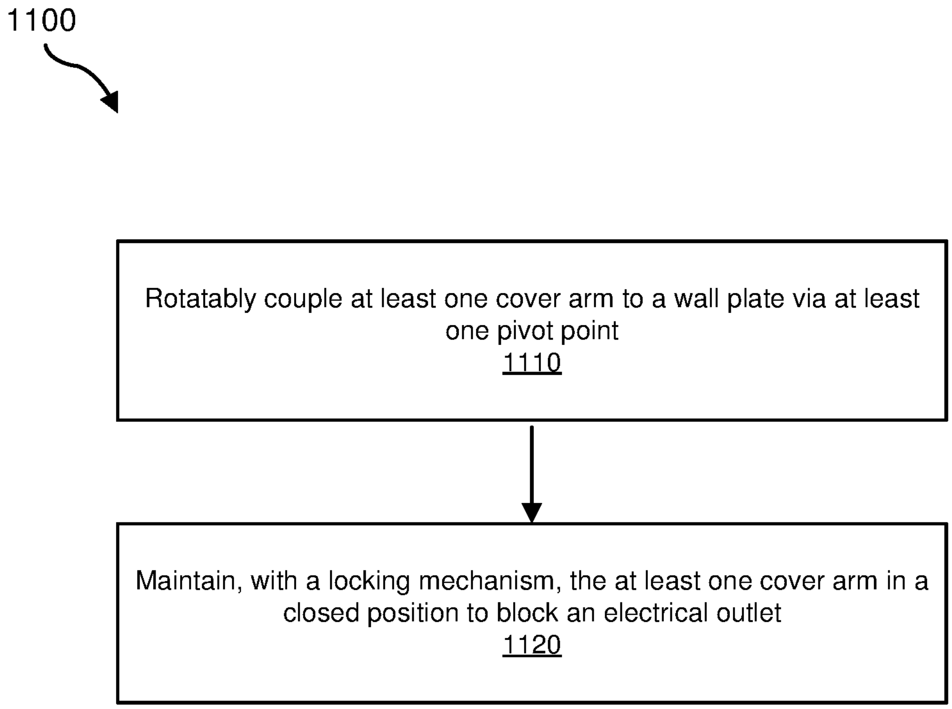
FIG. 11 is a flow diagram illustrating a method of fabricating a tamper-resistant electrical outlet cover, according to at least one embodiment of the present disclosure.

FIG. 10 is a perspective view of an outlet cover 1000, according to at least one additional embodiment of the present disclosure. In some respects, the outlet cover 1000 may be similar to the outlet covers described above. For example, the outlet cover 1000 may include a wall plate 1002 for laterally surrounding an electrical outlet 1004. A first cover arm 1006A and a second cover arm 1006B (collectively referred to as "cover arms 1006") may be configured to block access to the electrical outlet 1004 when in a closed position (e.g., in the position of the first cover arm 1006A in FIG. 10). Locking mechanisms 1010 may maintain the cover arms 1006 in the closed position when the locking mechanisms 1010 are locked. The cover arms 1006 may also be able to rotate to an open position (e.g., in the position of the second cover arm 1006B as shown in FIG. 10) when the locking mechanisms 1010 are unlocked.

As shown in FIG. 10, the cover arms 1006 may be rotatably coupled to the wall plate 1002 in positions that are diagonal from (e.g., not directly above nor directly to the side) the electrical outlet 1004. Due to the diagonal placement of the cover arms 1006, the cover arms 1006 may have an angled distal end. This shape may enable the cover arms 1006 to fully cover and block the electrical outlet 1004 when in the closed position.

In addition, the locking mechanisms 1010 may respectively include knobs 1060. Each of the knobs 1060 may be rotated to unlock the locking mechanisms 1010, such as in a rotational direction opposite to an opening cover arm 1006. For example, the knob 1060 may be rotated in a counterclockwise direction to unlock the locking mechanism 1010, after which the cover arm 1006 may be rotated in a clockwise direction to unblock the electrical outlet 1004. This combination of movements may be difficult or impossible for a young child to accomplish, but possible for a typical adult. In additional examples, the cover arm 1006 may be movable (e.g., rotatable) into a position that exposes the electrical outlet 1004 only upon application of a minimum force (e.g., 5 lbf, 10 lbf, 15 lbf, etc.) that would be difficult or impossible for a young child to accomplish, but possible for a typical adult.

Thus, the present disclosure includes numerous different types and styles of locking mechanisms, cover arms, and wall plates.

FIG. 11 is a flow diagram illustrating a method 1100 of fabricating a tamper-resistant electrical outlet cover, according to at least one embodiment of the present disclosure. At operation 1110, at least one cover arm may be rotatably coupled to a wall plate via at least one pivot point. Operation 1110 may be performed in a variety of ways. For example, the cover arm may include a shaft and the wall plate may include a complementary recess. In another example, the wall plate may include a shaft and the cover arm may include a complementary recess. In additional examples, a shaft that is a separate piece from the cover arm and wall plate may be inserted into recesses in both the cover arm and the wall plate. The at least one cover arm may be biased to a closed position blocking access to the electrical outlet.

The at least one cover arm may include a first cover arm configured to cover a first receptacle of the electrical outlet when in the closed position and a second cover arm configured to cover a second receptacle of the electrical outlet when in the closed position.

At operation 1120, the at least one cover arm may be maintained, with a locking mechanism, in the closed position to block the electrical outlet. Operation 1120 may be performed in a variety of ways. By way of example and not limitation, any of the locking mechanisms described above may be used to maintain the at least one cover arm in the closed position. The locking mechanism may be configured to be unlocked to allow for rotation out of the closed position and into an open position in which the receptacles of the electrical outlet are exposed and available for use. For example, the locking mechanism may be configured to be unlocked with a push button, two opposing squeeze buttons or levers, a push lever, a slider, a knob, or the like.

Accordingly, the present application includes tamper-resistant outlet covers and related methods. The outlet covers may include a wall plate and rotatable cover arms that cover an electrical outlet in a closed position and that can be rotated into an open position unblocking the electrical outlet. The cover arms may be locked in the closed position with a locking mechanism. The locking mechanism may be configured to be unlocked by a user to rotate the cover arms to the open position. Unlocking the locking mechanism and the rotation of the cover arms may involve two separate and distinct movements, which may require dexterity, coordination, and/or strength that a young child would find difficult or impossible. Additionally or alternatively, rotating the cover arms may require a minimum force (e.g., 5 lbf, 10 lbf, 15 lbf, etc.) that is difficult or impossible for a young child to achieve. Thus, embodiments of the present disclosure may improve a safety of electrical outlets while remaining simple to use for a typical adult. In addition, the cover arms may remain connected to the wall plate, eliminating a risk of misplacing the cover arms. Moreover, in some embodiments the cover arms may include one or more biasing elements that automatically rotate and lock the cover arms into the closed position upon unplugging an electrical plug from the corresponding electrical outlet or upon releasing the cover arms without any electrical plug present.

The following example embodiments are also included in the present disclosure.

Example 1: A tamper-resistant electrical outlet cover, which may include: a wall plate shaped and sized for laterally surrounding an electrical outlet; at least one cover arm rotatably coupled to the wall plate via at least one pivot point; and a locking mechanism configured to: maintain the cover arm in a closed position blocking the electrical outlet when the locking mechanism is locked, and enable the cover arm to rotate about the pivot point into an open position to expose the electrical outlet when the locking mechanism is unlocked.

Example 2: The outlet cover of Example 1, which may further include at least one biasing element configured to bias the cover arm to the closed position.

Example 3: The outlet cover of Example 2, wherein the biasing element includes a torsional spring.

Example 4: The outlet cover of any of Examples 1 through 3, wherein the at least one cover arm includes a first cover arm for selectively covering a first receptacle of the electrical outlet and a second cover arm for selectively covering a second receptacle of the electrical outlet.

Example 5: The outlet cover of Example 4, wherein the first cover arm is rotatably coupled to the wall plate at a first pivot point and the second cover arm is rotatably coupled to the wall plate at a second, different pivot point.

Example 6: The outlet cover of Example 5, wherein: the first pivot point is located in a first region of the wall plate selected from the group consisting of: an upper region of the wall plate, a laterally side region of the wall plate, a corner region of the wall plate, or a lower region of the wall plate; and the second pivot point is located in a second region of the wall plate selected from the group consisting of: the upper region of the wall plate; the laterally side region of the wall plate; the corner region of the wall plate, or the lower region of the wall plate.

Example 7: The outlet cover of Example 5 or Example 6, wherein the wall plate further includes a first extension including the first pivot point and a second extension including the second pivot point.

Example 8: The outlet cover of Example 7, wherein the first extension extends upward from the wall plate and the second extension extends from a lateral side of the wall plate.

Example 9: The outlet cover of any of Examples 1 through 8, wherein an outer surface of the at least one cover arm farthest from the wall plate is configured to be positioned at least 12 mm away from the electrical outlet in the closed position to inhibit a pin of an electrical plug from reaching a conductive contact of the electrical outlet.

Example 10: The outlet cover of any of Examples 1 through 9, wherein the at least one cover arm includes a distal portion that covers the electrical outlet when the at least one cover arm is in the closed position, wherein the distal portion has a thickness of at least 12 mm.

Example 11: The outlet cover of any of Examples 1 through 10, wherein the locking mechanism includes at least one squeeze button on a side of the at least one cover arm configured to unlock the locking mechanism and to allow the at least one cover arm to rotate from the closed position to the open position Example 12: The outlet cover of Example 11, wherein the locking mechanism includes at least one release mechanism selected from the following group: a squeeze button on the at least one cover arm; a push button positioned on the at least one cover arm over the pivot point; a push button positioned on the at least one cover arm away from the pivot point; a push button positioned on the wall plate; a pull button positioned on the at least one cover arm; a pull button positioned on the wall plate; a slider positioned on the at least one cover arm; or a slider positioned on the wall plate.

Example 13: The outlet cover of any of Examples 1 through 12, wherein the cover arm is rotatable about an axis extending away from a face of the wall plate.

Example 14: The outlet cover of any of Examples 1 through 13, wherein the wall plate and the cover arm comprise at least one of a metal material or a polymer material.

Example 15: A tamper-resistant electrical outlet cover, which may include: a wall plate shaped and sized for laterally surrounding an electrical outlet; a first cover arm rotatably coupled to the wall plate, the first cover arm configured for covering a first receptacle of the electrical outlet when in a closed position; a second cover arm rotatably coupled to the wall plate, the second cover arm configured for covering a second receptacle of the electrical outlet when in a closed position; a first locking mechanism configured to maintain the first cover arm in the closed position when locked and to allow for rotation of the first cover arm into an open position uncovering the first receptacle when unlocked; and a second locking mechanism configured to maintain the second cover arm in the closed position when locked and to allow for rotation of the second cover arm into an open position uncovering the second receptacle when unlocked.

Example 16: The outlet cover of Example 15, wherein each of the first cover arm and the second cover arm is biased to the closed position.

Example 17: The outlet cover of Example 15 or Example 16, wherein the first cover arm includes at least one first button for unlocking the first locking mechanism; and the second cover arm includes at least one second button for unlocking the second locking mechanism.

Example 18: A method of fabricating a tamper-resistant electrical outlet cover, which method may include: rotatably coupling at least one cover arm to a wall plate via at least one pivot point; and maintaining, with a locking mechanism, the at least one cover arm in a closed position to block an electrical outlet, wherein the locking mechanism is configured to be unlocked to allow the at least one cover arm to rotate about the pivot point into an open position to expose the electrical outlet.

Example 19: The method of any of Example 18, wherein rotatably coupling the at least one cover arm to the wall plate includes: rotatably coupling a first cover arm to the wall plate via a first pivot point, the first cover arm configured to cover a first receptacle of the electrical outlet when in the closed position; and rotatably coupling a second cover arm to the wall plate via a second pivot point, the second cover arm configured to cover a second receptacle of the electrical outlet when in the closed position.

Example 20: The method of Example 18 or Example 19, which may further include biasing the at least one cover arm to the closed position.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

In some examples, relational terms, such as "first," "second," "upper," "lower," "up," "side," "front," "back," etc., may be used for clarity and convenience in understanding the disclosure and accompanying drawings and do not connote or depend on any specific preference, orientation, or order, except where the context clearly indicates otherwise.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A tamper-resistant electrical outlet cover comprising:
- a wall plate shaped and sized for laterally surrounding an electrical outlet wherein said electrical outlet has a first electrical receptacle;
- a first cover arm which pivots about a pivot point which extends generally perpendicular to said wall plate wherein said first cover arm rotates about a plane substantially parallel to said wall plate and said first cover arm is moveable from a closed position covering said first electrical receptable to an opened position exposing said first electrical receptacle and including a first cover arm locking mechanism and a first cover arm biasing element which are actuated to move said first cover arm from said closed position to said opened position, said first cover arm further including a pivot end portion on one end of said first cover arm adjacent said pivot point and a receptacle covering end portion on an opposing end of said first cover arm;
- wherein said first cover arm locking mechanism on said pivot end portion of said first cover arm is moveable from a locked position to an unlocked position wherein said first cover arm locking mechanism is activated to move said first cover arm from said locked position to said unlocked position; and
- wherein said first cover arm biasing element biases said first cover arm in said closed position wherein a predetermined rotational force is applied to said first cover arm to rotate said first cover arm about said pivot point of said first cover arm.

2. The outlet cover of claim 1, wherein said first cover arm biasing element comprises a torsional spring.

3. The outlet cover of claim 1 wherein said first cover arm is configured for selectively covering a first receptacle of the electrical outlet and said outlet cover further comprises a second cover arm for selectively covering a second receptacle of the electrical outlet.

4. The outlet cover of claim 3, wherein the second cover arm is rotatably coupled to the wall plate at a second pivot point.

5. The outlet cover of claim 4 wherein:
- the first pivot point is located in a first region of the wall plate selected from the group consisting of: an upper region of the wall plate, a laterally side region of the wall plate, a corner region of the wall plate, or a lower region of the wall plate; and
- the second pivot point is located in a second region of the wall plate selected from the group consisting of: the upper region of the wall plate, the laterally side region of the wall plate, the corner region of the wall plate, or the lower region of the wall plate.

6. The outlet cover of claim 4, wherein the wall plate further comprises a first extension comprising the first pivot point and a second extension comprising the second pivot point.

7. The outlet cover of claim 1, wherein an outer surface of the first cover arm is configured to be positioned at least 12 mm away from the electrical outlet in the closed position to inhibit a pin of an electrical plug from reaching a conductive contact of the electrical outlet.

8. The outlet cover of claim 1, wherein said receptacle covering end portion of the first cover arm comprises a distal portion that covers the electrical outlet when the first cover arm is in the closed position, wherein said receptacle covering end portion has a thickness of at least 12 mm.

9. The outlet cover of claim 1, wherein the first cover arm locking mechanism comprises at least one squeeze button on a side of the first cover arm configured to unlock the first cover arm locking mechanism and to allow the first cover arm to rotate from the closed position to the opened position.

10. The outlet cover of claim 9, wherein the locking mechanism comprises at least one release mechanism selected from the group consisting of:
- a squeeze button on the at least one cover arm;
- a push button positioned on the at least one cover arm over the pivot point;
- a push button positioned on the at least one cover arm away from the pivot point;
- a push button positioned on the wall plate;
- a pull button positioned on the at least one cover arm;
- a pull button positioned on the wall plate;
- a slider positioned on the at least one cover arm; or
- a slider positioned on the wall plate.

11. The tamper-resistant electrical outlet cover according to claim 1 wherein said first cover arm locking mechanism is depressible to move said first cover arm from said closed position to said opened position.

12. The tamper-resistant electrical outlet cover according to claim 1 wherein said first cover arm locking mechanism is a lever having a locking tab at a lower end adjacent said wall plate wherein said lever is biased outward and wherein said wall plate defines a locking recess for cooperating with said lever to facilitate said lever to rotate within said locking recess when said first cover arm is rotated and said lever is depressed.

13. The tamper-resistant electrical outlet cover according to claim 12 wherein said locking recess includes a tooth for cooperating with said locking tab.

14. The tamper-resistant electrical outlet cover according to claim 1 wherein said first cover arm further comprises a pair of said first cover arm locking mechanisms wherein each first cover arm locking mechanism are positioned on opposing side surfaces of said first cover arm.

15. A tamper-resistant electrical outlet cover comprising:
- a wall plate shaped and sized for laterally surrounding an electrical outlet wherein said electrical outlet has a first electrical receptacle;
- a first cover arm which pivots about a first pivot point which extends generally perpendicular to said wall plate wherein said first cover arm rotates about a plane substantially parallel to said wall plate and said first cover arm is moveable from a closed position covering said first electrical receptable to an opened position exposing said first electrical receptacle;

a first cover arm locking mechanism which includes a lever for cooperating with said wall plate, wherein said first cover arm locking mechanism is actuated to move said first cover arm from said closed position to said opened position, said first cover arm further including a pivot end portion on one end of said first cover arm adjacent said first pivot point and a receptacle covering end portion on an opposing end of said first cover arm; and wherein said first cover arm locking mechanism is on said pivot end portion of said first cover arm wherein said first cover arm locking mechanism is moveable from a locked position to an unlocked position wherein said first cover arm locking mechanism is actuated to move said first cover arm to said unlocked position.

16. The tamper-resistant electrical outlet cover according to claim 15 wherein said first cover arm locking mechanism comprises two of said first cover arm locking mechanisms on said pivot end portion of said first cover arm wherein said first cover arm locking mechanisms are moveable from a locked position to an unlocked position wherein said first cover arm locking mechanisms are actuated to move said first cover arm from said locked position to said unlocked position.

17. The tamper-resistant electrical outlet cover according to claim 15 further comprising a second cover arm for selectively covering a second receptacle of the electrical outlet.

18. The tamper-resistant electrical outlet cover according to claim 17 wherein said second cover arm pivots about a second pivot point which extends generally perpendicular to said wall plate wherein said second cover arm rotates about a plane substantially parallel to said wall plate and said second cover arm is moveable from a closed position covering said second electrical receptable to an open position exposing said second electrical receptacle.

19. The tamper-resistant electrical outlet cover according to claim 18 wherein said second pivot point is generally offset from said first pivot point on said wall plate.

20. The tamper-resistant electrical outlet cover according to claim 15 wherein said first cover arm includes a biasing element which biases said first cover arm in said closed position wherein a predetermined force is applied to said first cover arm to rotate said first cover arm about said first pivot point of said first cover arm.

21. The tamper-resistant electrical outlet cover according to claim 15 wherein said first cover arm locking mechanism is biased in said locked position.

22. The tamper-resistant electrical outlet cover according to claim 15 wherein said lever includes a locking tab at a lower end adjacent said wall plate wherein said lever is biased outward and wherein said wall plate defines a locking recess for cooperating with said lever to facilitate said lever to rotate within said locking recess when said first cover arm is rotated and said lever is depressed.

* * * * *